United States Patent
Ory

(10) Patent No.: US 7,100,958 B2
(45) Date of Patent: Sep. 5, 2006

(54) TRIM ELEMENT, ESPECIALLY FOR THE INTERIOR OF A MOTOR VEHICLE, AND A METHOD FOR THE MANUFACTURE THEREOF

(75) Inventor: Daniel Ory, Meru (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 11/090,253

(22) Filed: Mar. 28, 2005

(65) Prior Publication Data

US 2005/0248176 A1 Nov. 10, 2005

(30) Foreign Application Priority Data

Mar. 26, 2004 (FR) .................................. 04 03157

(51) Int. Cl.
*B62D 25/14* (2006.01)
(52) U.S. Cl. ......................................... 296/70; 296/191
(58) Field of Classification Search ............. 296/24.34, 296/187.02, 191, 70, 1.08
See application file for complete search history.

(56) References Cited

U.S. PATENT DOCUMENTS

| 4,663,210 | A | * | 5/1987 | Schreiber et al. ............. 296/70 |
| 5,487,800 | A | * | 1/1996 | Ash ............................... 296/70 |
| 5,922,431 | A | | 7/1999 | Funato et al. |
| 5,976,295 | A | * | 11/1999 | Ang ............................. 156/219 |
| 6,280,816 | B1 | | 8/2001 | McCooey |
| 6,601,902 | B1 | * | 8/2003 | Rahmstorf et al. ........... 296/70 |
| 2004/0256879 | A1 | * | 12/2004 | Rave et al. ................... 296/70 |
| 2005/0183897 | A1 | * | 8/2005 | DePue .......................... 296/70 |

FOREIGN PATENT DOCUMENTS

JP         359213525 A  *  12/1984   .................. 296/70

* cited by examiner

*Primary Examiner*—Jason Morrow
(74) *Attorney, Agent, or Firm*—Young & Thompson

(57) ABSTRACT

A trim element (1) includes a base element (2) of rigid plastic material, a supple skin (4), and a layer of foam (6), the trim element having a principle region (8) and a marginal region (10). The marginal region (10) includes an end region (16) in which the base element has a substantially constant thickness (e16) and the layer of foam is absent, and a coupling region (18) at a distance from the edge (12) of the base element (2) and the edge (14) of the skin (4) and in which the base element (2) has a thickness (e16) smaller than the thickness (e16) in the end region (16).

16 Claims, 2 Drawing Sheets

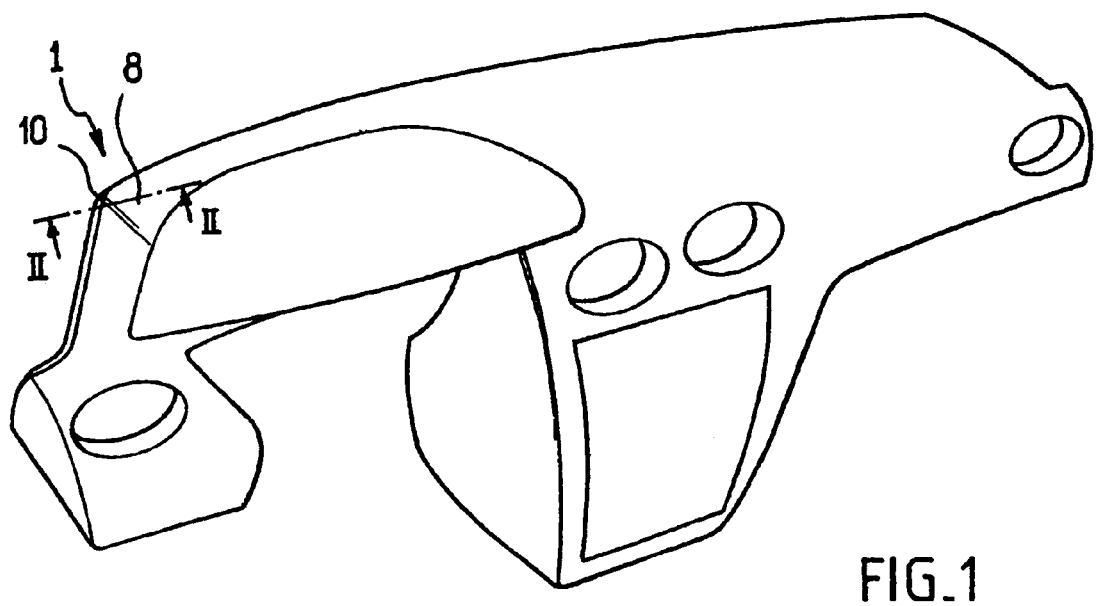
FIG_1
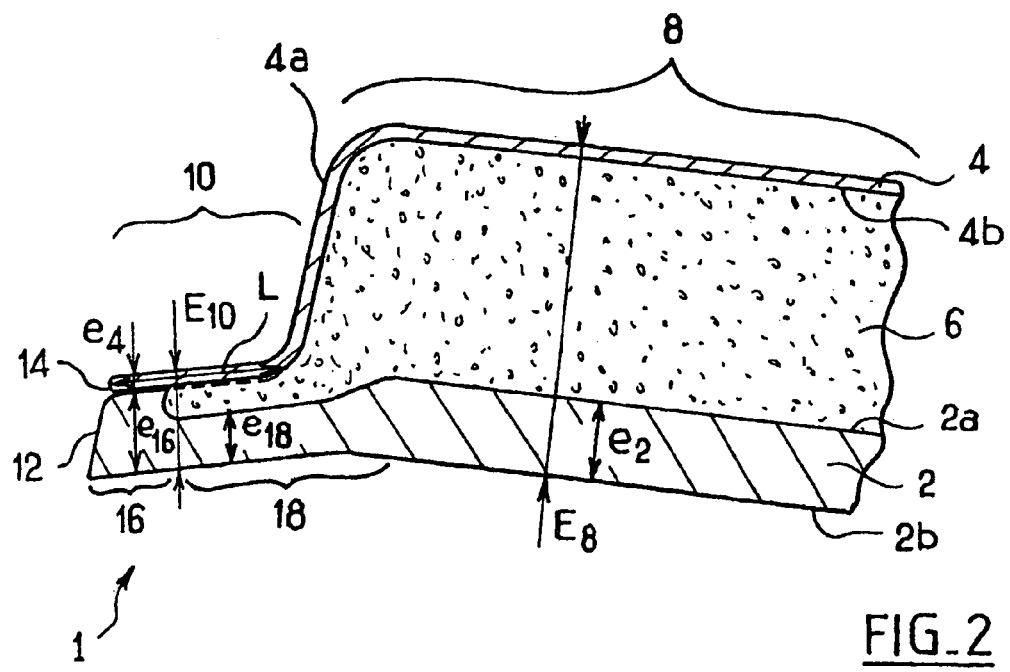
FIG_2

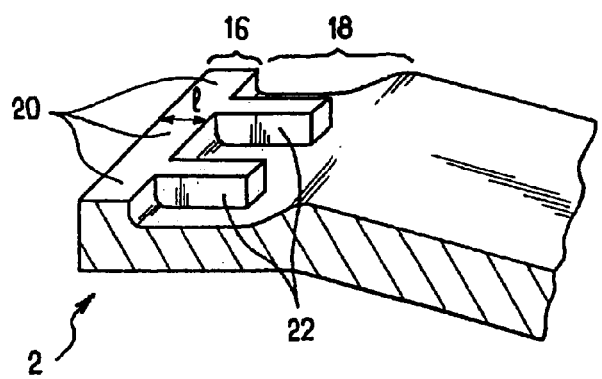
FIG. 3
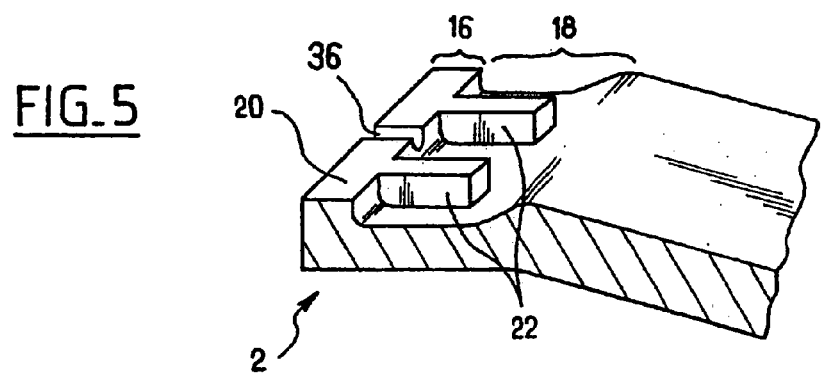
FIG. 5
FIG. 4
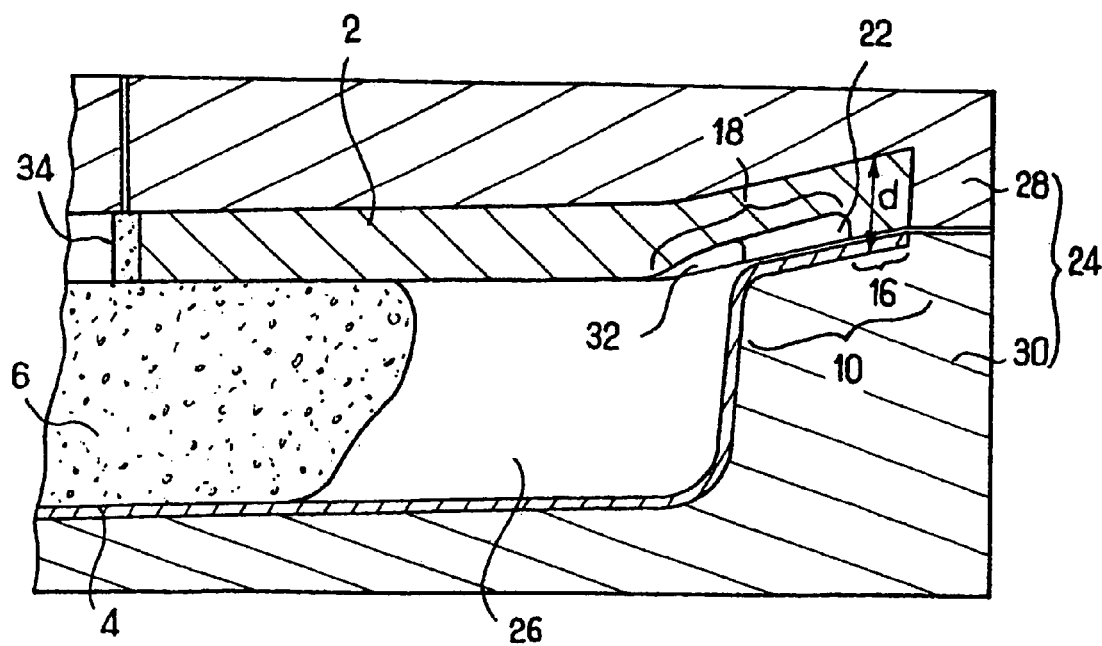

TRIM ELEMENT, ESPECIALLY FOR THE INTERIOR OF A MOTOR VEHICLE, AND A METHOD FOR THE MANUFACTURE THEREOF

BACKGROUND OF THE INVENTION

1. Field of the Invention

The invention relates to a trim element, especially an interior trim element of a vehicle, and to a method for the manufacture thereof.

2. Description of the Related Art

Interior trim elements for vehicles are already known which comprise a base element of rigid plastics material, a supple skin covering the base element and having a practically constant thickness, and a layer of foam located between the base element and the skin.

It is already known to produce such a trim element by arranging the skin and the base element in a mould cavity and injecting foam between the skin and the base element. The foam thus fixedly joins the skin and the base element to each other.

The trim element therefore comprises a marginal region in which the skin extends as far as the edge of the base element and is not connected thereto owing to the absence of foam. This external portion formed by the marginal region of the base element and of the skin is to be inserted into a groove in order to be assembled, for example, in a dashboard of a motor vehicle.

In order for this assembly to be effected under satisfactory conditions, the marginal region of the trim element must have a thickness which is substantially constant and which is markedly smaller than that of the principal region. However, owing to the absence of foam between the base element and the skin in the marginal region, the skin may move away from the base element and it may be difficult to insert the trim element into a groove. It is therefore desirable, especially when the marginal region has a substantial width, for the skin to be held against the base element over at least a portion of the marginal region.

In order for the skin to be held against the base element, it is possible to use the foam which already ensures that the skin and the base element are fixedly joined to each other in the principal region of the trim element. However, problems may arise in the marginal region, either owing to excessive clamping (absence of foam) or owing to insufficient clamping (passing of foam to the outside and onto the skin which may be soiled). In addition, the air which is expelled by the foam during injection into a small space may not be properly evacuated and may prevent the foam from advancing as far as the site intended for holding the skin in position.

SUMMARY OF THE INVENTION

In order to solve the above-mentioned problems, the invention uses the introduction of foam between the base element and the skin in one portion only of the marginal region, under well-defined conditions. In addition, in order that the skin should be held in position as far as the vicinity of the edge of the base element and, at the same time, that the marginal portion should preserve a constant thickness over a great width, it is desirable for the base element to delimit projections between which the foam can advance to the vicinity of the edge of the trim element.

To be more precise, the invention relates to a trim element, of the type which comprises a base element of rigid plastics material, a supple skin covering the base element and having a substantially constant thickness, and a layer of foam arranged between the base element and the skin, the trim element having a principal region and a marginal region, the marginal region extending as far as the edges of the base element and of the skin, the thickness of the trim element in the marginal region being substantially constant and smaller than its thickness in the principal region; according to the invention, the marginal region comprises an end region which extends to the periphery of the trim element and in which the base element has a substantially constant thickness and the layer of foam is absent, and a coupling region which is sited at a distance from the edge of the base element and the edge of the skin and in which the layer of foam extends between the base element and the skin, the base element having in the coupling region a thickness smaller than its thickness in the end region.

Preferably, the end region has portions of substantially constant width.

Preferably, the end region has, locally, projections directed towards the principal region. The projections advantageously extend as far as the principal region.

Preferably, the coupling region extends over the majority of the marginal region.

In a variant, the trim element comprises at least one ventilation duct located in the base element in the end region, between the coupling region and the outside of the end region. Preferably, the at least one ventilation duct is at a site on the trim element at which the base element extends beyond the skin.

The invention relates also to a method for the manufacture of a trim element according to the preceding paragraphs, which method comprises the following steps:

the production of a base element of rigid plastics material, having a marginal region which comprises an end region extending to the periphery and having a substantially constant thickness, and a coupling region extending at a distance from the edge of the base element and having a thickness smaller than the thickness in the end region, the production of a supple skin of substantially constant thickness, the covering of the base element by the skin, and the arrangement of the skin and the base element in a cavity of a mould having a closure and a main body, in such a manner that, when the mould is closed, the closure and the main body are at a substantially constant distance from each other in the marginal region which comprises the end region and at least one portion of the coupling region, the closing of the mould and the application of the skin, by pressure, against the base element in the end region, and the injection of foam between the base element and the skin.

Preferably, the base element comprises at least one ventilation duct located in the end region between the coupling region and the outside of the end region, and the method comprises the stopping of the injection operation when foam escapes via the duct, beyond the skin.

BRIEF DESCRIPTION OF THE DRAWINGS

Other features and advantages of the invention will be better understood on reading the following description of embodiments, which is given with reference to the appended drawings in which:

FIG. 1 is a perspective view of a trim element manufactured in accordance with the invention and comprising a base element;

FIG. 2 is a section through a portion of the trim element of FIG. 1, in accordance with the cutting plane marked by the reference II—II in FIG. 1;

FIG. 3 is a perspective view of a portion of the base element, sectioned across the plane II—II in FIG. 1;

FIG. 4 illustrates a step for carrying out the method according to the invention; and FIG. 5 is similar to FIG. 3 and illustrates a variant in which the moulding cavity is ventilated.

DETAILED DESCRIPTION OF THE INVENTION

FIGS. 1 to 3 represent an interior trim element of a vehicle in the form of a dashboard cover 1. The cover 1 comprises a base element 2, sometimes called an "insert", a supple skin 4 covering the base element 2, and a layer of foam 6 located between the base element 2 and the skin 4.

The base element 2 is formed from rigid plastics material and imparts its mechanical strength to the cover 1. It has the configuration of a plate of practically constant thickness $e_2$ fashioned in the necessary shape. The base element 2 therefore has two faces 2a, 2b and terminates at an edge 12. The face 2a is to be completely concealed by the supple skin 4 whose edge 14 advantageously terminates at the edge 12 of the base element 2.

The skin 4 has a visible face 4a, which is to impart aesthetic characteristics to the cover 1, and an opposite face 4b. It has a thickness $e_4$ which is practically constant over the entire cover 1, between the two faces 4a and 4b.

A layer of foam 6 is located between the face 2a of the base element 2 and the rear face 4b of the skin 4.

The cover 1 comprises a principal region 8 in which the layer of foam 6 has a relatively great thickness, and a marginal region 10. The marginal region 10 has a width L which is practically constant and it extends around the principal region 8, as far as the edges 12, 14 of the base element 2 and of the skin 4. The thickness $E_{10}$ of the cover 1 in the marginal region 10 is practically constant at the periphery of the cover 1.

The marginal portion 10 is to cooperate with another interior trim element of the vehicle by docking against that element. The marginal region 10 is therefore concealed in the other element once the assembly of the vehicle has been completed.

The cover 1 has, in its principal region 8, a thickness $E_8$ which is much greater than the thickness $E_{10}$ in the marginal region because the foam has a notable thickness in the principal region 8 so that it imparts a soft feel to the cover 1.

The marginal region 10 has a coupling region 18 which is contained practically entirely within the marginal region 10 or which may extend slightly beyond it towards the principal region 8. In this coupling region 18, the base element 2 forms recesses 32 (see FIG. 4). Therefore, in the coupling region 18, the thickness $e_{18}$ of the base element is smaller than its thickness $e_2$ in the principal region. In the trim element, the recess 32 is almost completely filled with foam.

The marginal region 10 comprises, towards the outside of the coupling region 18, an end region 16 which extends as far as the edge 12 of the base element. In this end region 16, the base element 2 has a thickness $e_{16}$ which is practically constant and which is preferably equal to the thickness $e_2$ of the base element 2 in its principal portion. The end region is covered by the skin without the interposition of foam 6 between the base element 2 and the skin 4. Therefore, the end region 16 has no foam. However, its width is relatively small compared with that of the marginal region 10.

The end region 16 comprises a series of portions 20 of practically constant width 1, and bridges 22 which project relative to the portions 20 towards the principal region 8, it even being possible for the projections to penetrate slightly into the principal region.

The width 1 of the end region 16, except for the bridges 22, is preferably smaller than half the width L of the marginal region 10. Consequently, the foam 6 is present in the majority of the marginal region 10. The coupling region 18 is therefore present in the majority of the marginal region 10.

It will be noted that, in the coupling region 18, the foam has a small thickness. It will therefore be appreciated that, if the foam drives before it the air remaining in the cavity of the mould, it may have difficulty in reaching the end region. FIG. 5 shows an improvement which enables this problem to be solved. To be more precise, FIG. 5 indicates the presence of a ventilation duct 36 formed in the base element 2 between the coupling region 18 and the outside of the base element. Therefore, this ventilation duct 36 is formed solely in the end region. When the foam drives air before it, the air can escape via the duct 36 to the outside of the base element.

It may be advantageous to form one or more ventilation ducts 36 at sites on the base element 2 where the latter extends beyond the skin so that it can be secured to another element. Thus, any foam which might escape via the duct 36 is concealed. It is also possible to tear off the superfluous foam when the trim element has been removed from the mould.

The method for the manufacture of the trim element described above will now be considered with reference to FIG. 4.

After its manufacture, the supple skin 4 is placed in a main body 30 of a mould 24, and it is then covered with the base element 2. The mould is closed by arranging a closure 28 in such a manner that a cavity 26 is delimited between the closure 28 and the main body 30.

The distance d separating the closure 28 from the main body 30 in the marginal region 10 is practically constant when the mould is in the closed position. This distance d is practically equal to the sum of the thickness $e_{16}$ of the base element 2 in the end region 16 and the thickness $e_4$ of the skin. Consequently, the skin 4 is applied against the base element 2 in the end region 16 when the mould is closed.

The foam can then be injected into the cavity 26 via a hole 34 formed for the purpose in the base element 2. The foam 6 flows between the base element 2 and the skin 4, but not into the end region 16 since, in that region, the skin is in contact with the base element 2. The foam may optionally pass only via ventilation ducts 36 when the latter are present. Since the thickness of the base element 2 in the coupling region 18 is smaller than its thickness in the end region 16, the recess 32 forms a space between the base element 2 and the skin in the coupling region 18, and the foam 6 penetrates into that space.

In one embodiment, the thicknesses $e_2$, $e_{16}$ of the base element 2, except for the coupling region 18, are of the order of from 3 to 5 mm, and the thickness of the recesses 32, which corresponds to the difference between the thicknesses $e_{16}$ and $e_{18}$ of the end region and the coupling region, is of the order of from 1 to 3 mm. In that case, the width 1 of the portions 20, that is to say, the minimum width of the end region 16, is advantageously of the order of from 3 to 5 mm. The thickness $e_4$ of the skin is preferably less than 1 mm, and the thickness $E_8$ of the cover 1 in its principal region 8 is advantageously of the order of from 3 to 8 mm.

The base element 2 is advantageously produced from polyolefin, while the skin 4 may be formed by a composite assembly comprising a textile material, with a sheet of polyvinyl chloride or of polyolefin. The foam is advantageously formed by a polyurethane.

The invention claimed is:

1. Trim element comprising:
    a base element of rigid plastics material having an edge;
    a supple skin covering said base element and extending to said base element edge and having a substantially constant thickness;
    a layer of foam arranged between said base element and said skin;
    a principal region having a thickness;
    a marginal region having a thickness and extending to said base element edge, and said marginal region thickness being substantially constant and smaller than said thickness of the principal region;
    said marginal region having an end region extending to a periphery of said trim element at which said base element has a substantially constant thickness and said layer of foam is absent; and
    said marginal region having a coupling region located a distance from said base element edge at which said layer of foam extends between said base element and said skin, and the base element in said coupling region having a thickness smaller than in the end region.

2. The trim element according to claim 1, wherein said end region has portions of substantially constant width.

3. The trim element according to claim 2, wherein said end region has, locally, projections directed towards said principal region.

4. The trim element according to claim 3, wherein said projections extend as far as said principal region.

5. The trim element according to claim 1, wherein the coupling region extends over a majority of said marginal region.

6. The trim element according to claim 1, further comprising at least one ventilation duct located in said base element in said end region, between said coupling region and outside of said end region.

7. The trim element according to claim 6, wherein said at least one ventilation duct is at a site on said trim element at which said base element extends beyond said skin.

8. A method for manufacturing a trim element according to claim 1, comprising the following steps:
    forming a base element of rigid plastics material having an edge and having a marginal region which comprises an end region extending to the periphery of said marginal region and having a substantially constant thickness, and a coupling region extending a distance from said base element edge and having a thickness smaller than said end region thickness;
    forming a supple skin of substantially constant thickness;
    covering of said base element by said skin;
    arranging said skin and said base element in a cavity of a mould having a closure and a main body, in such a manner that, when said mould is closed, said closure and said main body are at a substantially constant distance from each other in said marginal region which comprises said end region and at least a portion of said coupling region;
    closing of said mould;
    applying said skin by pressure against said base element in said end region; and
    injecting foam between said base element and said skin.

9. The method according to claim 8, in which said base element comprises at least one ventilation duct located in said end region between said coupling region and outside of said end region, and said method further comprising:
    stopping of said injecting when foam escapes via the duct, beyond said skin.

10. The trim element according to claim 2, wherein said coupling region extends over a majority of said marginal region.

11. The trim element according to claim 3, wherein said coupling region extends over a majority of said marginal region.

12. The trim element according to claim 4, wherein said coupling region extends over a majority of said marginal region.

13. The trim element according to claim 2, further comprising at least one ventilation duct located in said base element in said end region between the coupling region and outside of said end region.

14. The trim element according to claim 3, further comprising at least one ventilation duct located in said base element in said end region, between said coupling region and outside of said end region.

15. The trim element according to claim 4, further comprising at least one ventilation duct located in said base element in said end region, between said coupling region and outside of said end region.

16. The trim element according to claim 5, further comprising at least one ventilation duct located in said base element in said end region, between said coupling region and outside of said end region.

* * * * *